United States Patent [19]

Nakane

[11] Patent Number: 5,912,744

[45] Date of Patent: Jun. 15, 1999

[54] IMAGE FORMING APPARATUS HAVING IMAGE PROCESSING UNIT CONTAINING A PLURALITY OF FILTERS ARRANGED IN PARALLEL TO EACH OTHER

[75] Inventor: Naomi Nakane, Yokohama, Japan

[73] Assignee: Kabushiki Kaisha Toshiba, Kawasaki, Japan

[21] Appl. No.: 08/815,113

[22] Filed: Mar. 11, 1997

[30] Foreign Application Priority Data

Mar. 22, 1996 [JP] Japan ................... 8-066424

[51] Int. Cl.$^6$ .................................................. H04N 1/409
[52] U.S. Cl. ...................... 358/447; 358/530; 358/296; 382/304; 382/263; 382/264
[58] Field of Search .................................. 358/296, 447, 358/448, 530, 532, 533; 382/263, 264, 266–269, 302, 304, 271

[56] References Cited

U.S. PATENT DOCUMENTS

| 4,476,497 | 10/1984 | Oshikoshi et al. | 358/298 |
| 5,023,919 | 6/1991 | Wataya | 382/54 |
| 5,134,667 | 7/1992 | Suzuki | 382/22 |
| 5,166,810 | 11/1992 | Sorimachi et al. | 358/462 |
| 5,189,528 | 2/1993 | Takashima et al. | 358/448 |
| 5,351,305 | 9/1994 | Wood et al. | 382/22 |
| 5,374,995 | 12/1994 | Loveridge et al. | 358/447 |
| 5,381,490 | 1/1995 | Shin | 382/54 |
| 5,392,365 | 2/1995 | Steinkirchner | 382/22 |
| 5,539,541 | 7/1996 | Ushida | 358/532 |
| 5,724,444 | 3/1998 | Yamanishi | 382/271 |

FOREIGN PATENT DOCUMENTS

| 0 117 154 | 8/1984 | European Pat. Off. . |
| 0 198 161 | 10/1986 | European Pat. Off. . |

OTHER PUBLICATIONS

The Journal of the Institute of Image Electronics Engineers of Japan, vol. 22, No. 5, 1993; "High Quality Image Processing Method Using Moire Suppression and Edge Enhancement Filtering"; pp. 445–450.

Primary Examiner—Peter S. Wong
Assistant Examiner—Derek J. Jardieu
Attorney, Agent, or Firm—Limbach & Limbach, LLP

[57] ABSTRACT

The present invention provides an image forming apparatus including a scanner for reading image data from an original sheet, a first filter for filtering the image data, a second filter provided in parallel with the first filter, and different from the first filter, adding circuit means for adding up the outputs from these filters, and a function for forming an image on the basis of the result of addition

17 Claims, 5 Drawing Sheets

| f(i-1, j-1) | f(i, j-1) | f(i+1, j-1) |
|---|---|---|
| f(i-1, j) | f(i, j) | f(i+1, j) |
| f(i-1, j+1) | f(i, j+1) | f(i+1, j+1) |

FIG. 5

| Ld | Lb | Ld |
|---|---|---|
| Lc | La | Lc |
| Ld | Lb | Ld |

FIG. 6

| Hd | Hb | Hd |
|---|---|---|
| Hc | Ha | Hc |
| Hd | Hb | Hd |

FIG. 7

| EVALUATION ITEM \ METHOD | CONVENTIONAL METHOD | PRESENT INVENTION | | |
|---|---|---|---|---|
| | K=1.3 | K=0.2 | K=0.6 | K=1.3 |
| FINE CHARACTER REPRODUCIBILITY | ○ | △ | ○ | ○ |
| MOIRE | ○ | ○ | ○ | × |

FIG. 8

| 0.0625 | 0.1250 | 0.0625 |
|---|---|---|
| 0.1250 | 0.2500 | 0.1250 |
| 0.0625 | 0.1250 | 0.0625 |

FIG. 9A

| 1 | 0 | 1 |
|---|---|---|
| 0 | -4 | 0 |
| 1 | 0 | 1 |

FIG. 9B

| 1 | 1 | 1 |
|---|---|---|
| 1 | -8 | 1 |
| 1 | 1 | 1 |

FIG. 9C

IMAGE FORMING APPARATUS HAVING IMAGE PROCESSING UNIT CONTAINING A PLURALITY OF FILTERS ARRANGED IN PARALLEL TO EACH OTHER

BACKGROUND OF THE INVENTION

The present invention relates to an image forming apparatus such as a digital copy machines which reads an image on an original sheet, processes the read image by an image processing devices and forms the image on a sheet.

Recently, image forming apparatus such as digital copy machines and facsimile devices have been rapidly popularized. In these digital office apparatus, the most important operation is the image processing for creating a high-quality image output from an image input by a scanner. Generally, the image input/output apparatus such as digital copy machines and facsimile devices, entail the problems of various types of deteriorations of space frequency as follows: the deterioration of the MTF (modulation transfer function) characteristics of the optical system for reading, and the generation of folded distortion caused by the limitation of the frequency band for digital sampling, which take place during the data inputting; the deterioration in the developing system; the generation of moire which is unique to digital process, and the like.

In order to avoid these problems, the image processing device requires an MTF correction. Such an MTF correction is called "filtering process", which is further divided into a low pass filtering (to be abbreviated as LPF) for suppressing moire and the like, and a high pass filtering (to be abbreviated as HPF) for emphasizing an edge or the like, of a character.

Conventionally, the LPF and HPF are carried out one at a time in series in the course of the flow of the entire image process, that is, an input image is subjected first to the LPF, then to the range correction process for correcting the contrast of the image, and to the HPF.

In general, the filtering process of a digital copying machine, facsimile or the like, is performed through a two-dimensional digital filtering process in the main scanning and the sub-scanning directions. More specifically, the filtering process is performed by multiplying each pixel of a local region consisting of a pixel to be processed (focused pixel) and peripheral pixels, by a coefficient which corresponds to a respective pixel.

Therefore, in the case where a process is performed by a mask size of (n×n), the process in the sub-scanning direction requires line buffers of n lines. However, the filtering process is carried out by the conventional method, the process is performed in a serial manner, and therefore in the case of the LPF and HPF process of a mask size of (3×3), line buffers of a total of 4 lines, two lines for each, are required.

As described above, with the conventional technique, in the case where a filtering process of an image processing apparatus is carried out by a mask size of (n×n), the process in the sub-scanning direction requires line buffers of n lines. With this structure, if the filtering process is carried out by the conventional method, the process is performed in a serial manner, and therefore in the case of the LPF and HPF process of a mask size of, for example, (3×3), line buffers of a total of 4 lines, two lines for each, are required.

BRIEF SUMMARY OF THE INVENTION

The object of the present invention is to provide an image forming apparatus capable of reducing the number of line buffers used in the filtering process carried out by a mask size of (n×n).

According to the present invention, there is provided an image forming apparatus including means for reading image data from an original sheet; first processing means for processing the image data read by the reading means through a low pass filter, and outputting a first process result; second processing means, provided in parallel with the first processing means, for processing the image data read by the reading means through a high pass filter having a filter frequency range higher than that of the low pass filter, and outputting a second process result; adding means for adding up the first process result and the second process result, and outputting a result of addition; and image forming means for forming an image on the basis of the result of addition.

With the above-described structure, the present invention exhibits the following advantage. That is, the present invention does not employ the structure of the conventional technique, in which a plurality of filtering processes are arranged in series, and each filtering process is carried out one at a time in sequence, but according to the present invention, a plurality of filtering processes are carried out in a parallel manner for image data. With the structure of the present invention described above, it is no longer necessary to provide a line buffer for each and every filter as in the conventional technique, and therefore the size and the production cost of the apparatus can be reduced.

More specifically, with the conventional technique, for example, 2 lines of line buffers are required just before each filter, and therefore when there are two filters, a total of 4 lines of line buffers are required. By contrast, with the structure of the present invention, image data are processed in parallel, and therefore it suffices only if line buffers of the number for only one filter in the conventional case should be provided. Consequently, in the case where there are two filters, the same performance can be achieved by only 2 lines of line buffers. For this reason, it becomes possible, with the structure of the present invention, to reduce the size and production cost of the apparatus.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

An embodiment of the present invention will now be described with reference to accompanying drawings.

Figure 2:
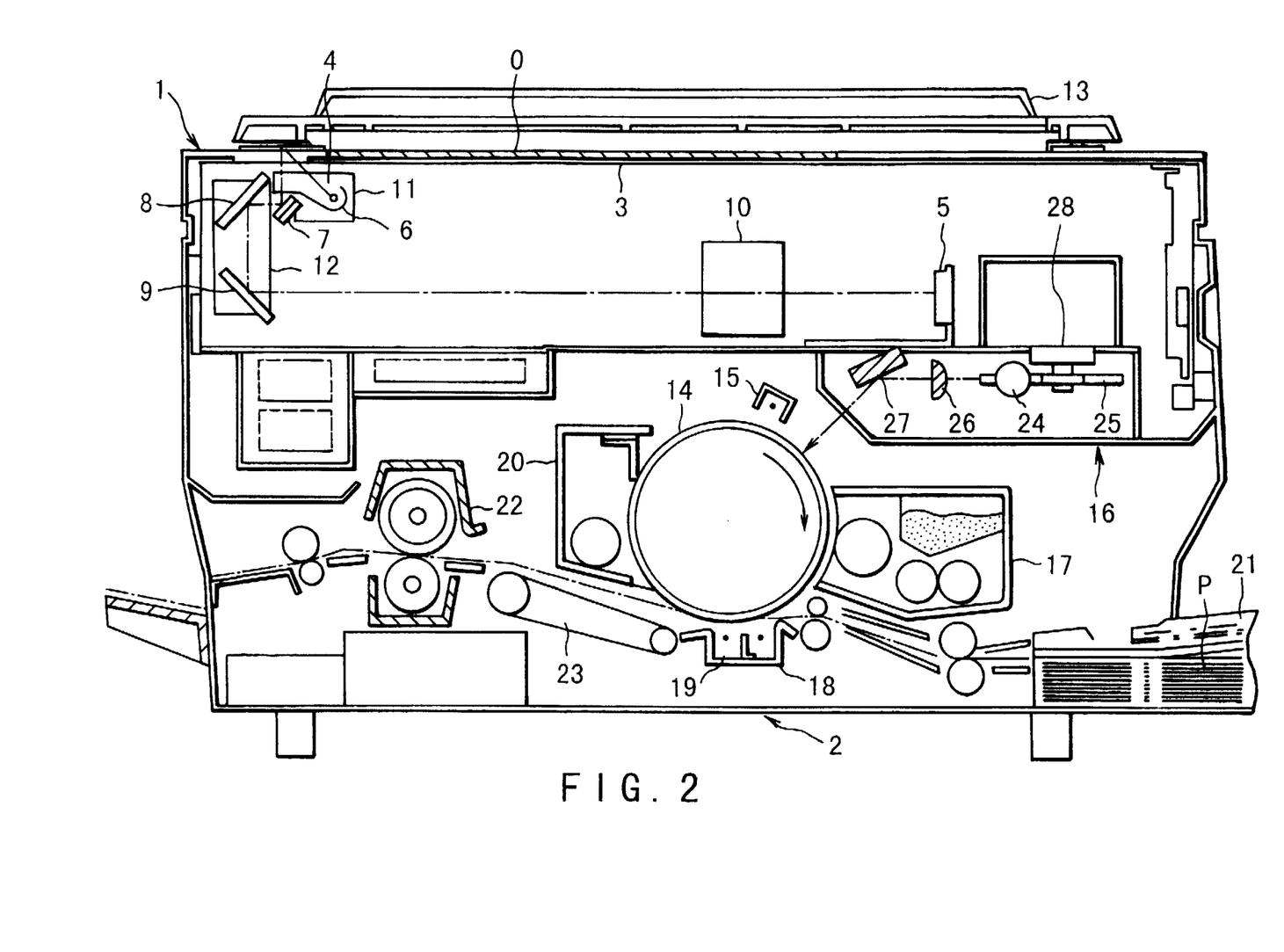
FIG. 2 is a cross sectional view of the brief structure of the digital copying machine, which includes the image processing apparatus of the present invention.

FIG. 2 is a cross sectional view of an example of the internal structure of a digital copying machine, which is an embodiment of the image forming apparatus according to the present invention.

As can be seen in the figure, the digital copying machine includes a scanner unit 1 for optically reading image data on an original O, and a printer unit 2 for outputting an image read via the scanner unit 1 on a recording medium, which is a copy sheet P.

In the scanner unit 1, an original to be copied, is placed on an original placement table 3, and the original O placed on the original placement table 3, is irradiated by a fluorescent lamp 4 extended in the sub-scanning direction, which serves as a light source. The light beam reflected from the original O irradiated by the fluorescent lamp 4 is photoelectrically converted by a CCD sensor 5 which serves as a photoelectric conversion element, and thus the image data of the reflection light beam is converted into an image signal.

All along the fluorescent lamp 4, a reflector 6 is provided so as to converge the illumination light from the fluorescent lamp 4 on the original O at a high efficiency. Further, between the fluorescent lamp 4 and the CCD sensor 5, a plurality of mirrors for bending optical paths through which light beams reflected from the original O pass, which proceed towards the CCD sensor 5 from the original O, a lens 10 for converging the reflection light beams on the light converging surface of the CCD sensor 5, and the like are provided.

The optical system for guiding the reflection light beams from the exposure lamp 4 and the original O to the CCD sensor 5 is provided on the carriages 11 and 12, and are conveyed in the main scanning direction by means of a pulse motor which is not shown. The sub-scanning directional area of the original O is irradiated by the fluorescent lamp 4, and the sub-scanning directional regions of the original O is sequentially irradiated as the carriages 11 and 12 are conveyed in the main scanning direction. Thus, the entire region of the original O is irradiated by the fluorescent lamp 4.

On the top of the original placement table 3, a original sheet cover 13 is provided for bringing the original O into tight contact with the placement table 3. The original sheet press cover can be replaced by, for example, an SDF, a semi-automatic original sheet feeding device, or an ADF, an automatic original sheet feeding device, in accordance with the size or performance of the digital copying machine.

In the printer unit 2 serving as the image forming device, a cylindrical photosensitive drum 14 which can be rotated in a desired direction by means of, for example, a motor (not shown) and is charged at a pre-determined potential, is provided. A laser beam is applied on the photosensitive drum 14, the potential of the beam-applied region on the drum, is varied, and a static latent image is formed on the photosensitive drum 14.

As surroundings of the photosensitive drum 14, there are arranged a charging device 15 for applying a predetermined potential to the photosensitive drum 14, a laser unit 16 for outputting a laser beam modulated in accordance with the image data, on the photosensitive drum 14, a developing device for developing a static latent image formed on the photosensitive drum 14 by the laser beam output from the laser unit 16, by supplying a visualizer, that is, toner, to the image, a transfer device 18 for transferring a toner image visualized on the photosensitive drum 14 by development by the developing device 17, on a recording medium, that is, a copy sheet P which is fed from a recording medium feeding unit, which will be explained later, and a removing device 19 for removing the copy sheet P from the photosensitive drum 14.

The laser unit 16 consists of a semiconductor laser oscillator for generating a laser beam, a polygon mirror 25 for converting the laser beam supplied from the semiconductor laser oscillator 24 via a collimate lens (not shown) into beams of scanning lines, each beam for one scanning line, an fθ lens 26 for converting the laser beams of scanning lines from the polygon mirror 25, into parallel light beams, a mirror 27 for reflecting the parallel light beams from the lens 26 so as to guide them to the photosensitive drum 14, and a mirror motor 28 for rotating the polygon mirror 25.

In addition, on the down-stream side of the removing device 19 with respect to the rotational direction of the photosensitive drum 14, a cleaner unit 20 is provided for the purpose of removing toner remaining on the surface of the photosensitive drum 14, and erasing the variance in potential created on the photosensitive drum 14 by the laser beam, for the next image forming operation.

Between the developing device 17 and the transfer device 18, a recording medium feeding unit 21 for feeding a copy sheet P on which a toner image formed on the photosensitive drum 14 is to be transferred, towards the transfer device 18, is provided.

Further, at a position along the direction in which the copy sheet P having a toner image transferred by the transfer device 18, is separated from the photosensitive drum 14, a fixing device 22 for fixing the toner image on the copy sheet, is provided. Between the fixing device 22 and the transfer device 18, a conveying device 23 for conveying copy sheets P to the fixing device 22, is provided.

Figure 3:
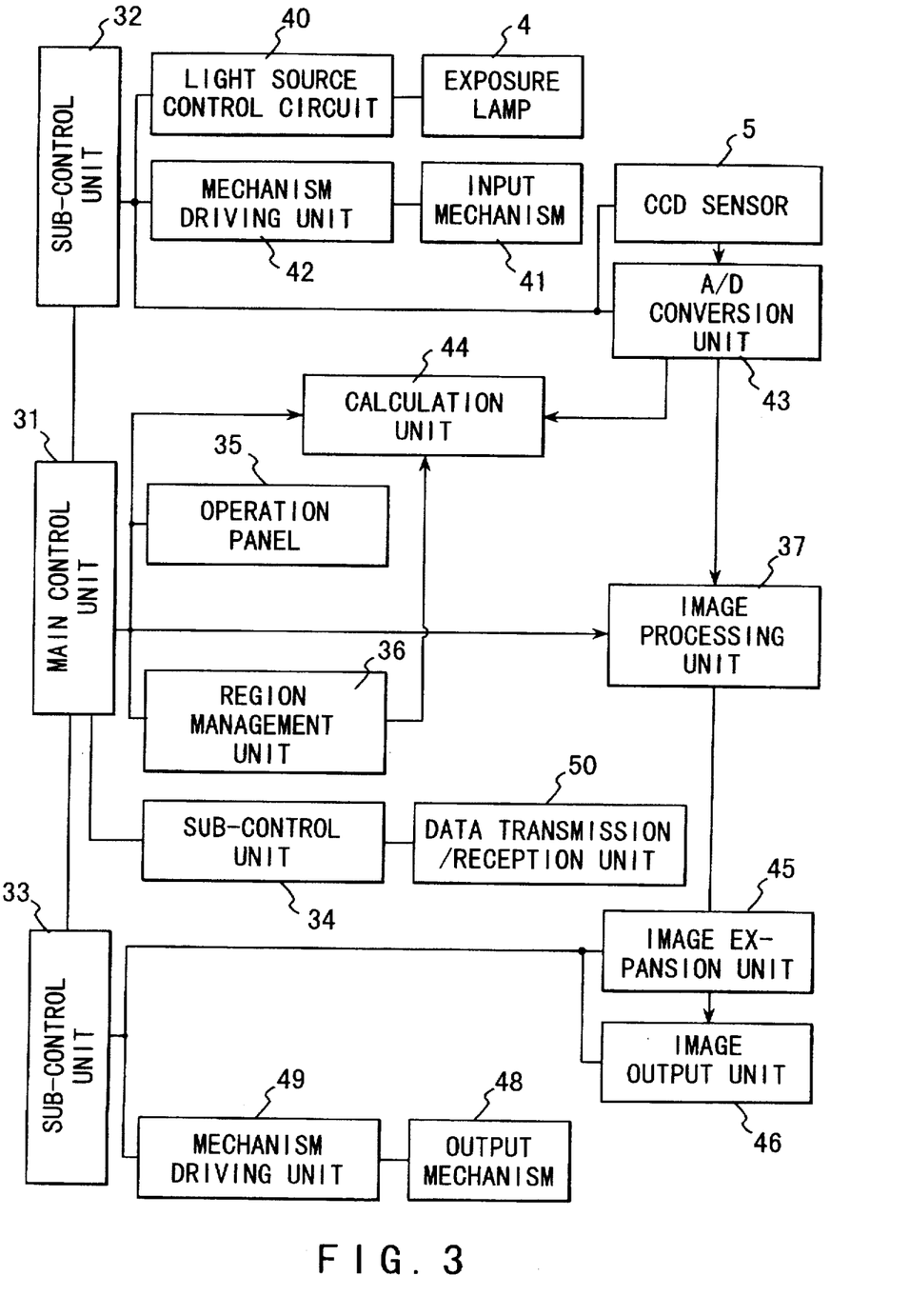
FIG. 3 is a schematic diagram showing the structure of the control system of the digital copying machine shown in FIG. 2.

FIG. 3 is a block diagram showing an example of the control system of the copying machine shown in FIG. 2.

As shown in FIG. 3, a calculation unit 44 for performing various types of calculations, and four sub-control units 32 to 34 each for executing the control of a respective unit, are connected to a main control unit 31 which controls the overall operation of the digital copying machine.

The main control unit 31 is connected to an operation panel 35 for instructing various types of image processing, a region management unit 36 for managing an image processing region, and an image processing unit 37 serving as an image processing device for improving the quality of image data inputted, editing the image data, and processing the image data, and the control unit 31 serves to control these members.

The sub-control unit 32 is connected to a light source control unit 40 for controlling the source light intensity of the fluorescent lamp 4, a mechanism driving unit 42 for controlling a mechanical input mechanism 41 such as the sheet feeding unit shown in FIG. 2, and an A/D conversion unit 43 for converting analog image data converted by the CCD sensor 5 for converting detected reflection light into image data, into a digital data signal, and the sub-control unit 32 serves to control these members.

The sub-control unit 33 is connected to an image expanding unit 45 for expanding edited or processed image data, for forming an image, and also storing the data, an image output unit 46 for outputting image data from the image expanding unit 45 (image data from the scanner unit 1) in the form of a pulse signal as a laser modulation signal (image data for the printer unit 2), and a mechanism drive unit 49 for driving an output unit mechanism 48 including drive systems such as motor and solenoid in the laser unit 16, and the sub-control unit 33 serves to control these members.

The sub-control unit 34 is connected to a data transmission/reception unit 50, and the unit 34 controls the transmission/reception of data with regard to an external devices.

In the digital copying machine described above, an original O is illuminated by the fluorescent lamp 4, and the reflection light reflected from the original O forms an image on the CCD sensor 5, where the image is converted into an analog electric signal. The analog image signal is converted into a digital signal by the A/D converting unit 43, and the digital signal converted is output to the image processing unit 37.

The image processing unit 37 performs, for example, the process of filtering image data from the scanner unit 1, the enlargement or contraction of image data in the main scanning direction, and the gradation process.

Figure 1:
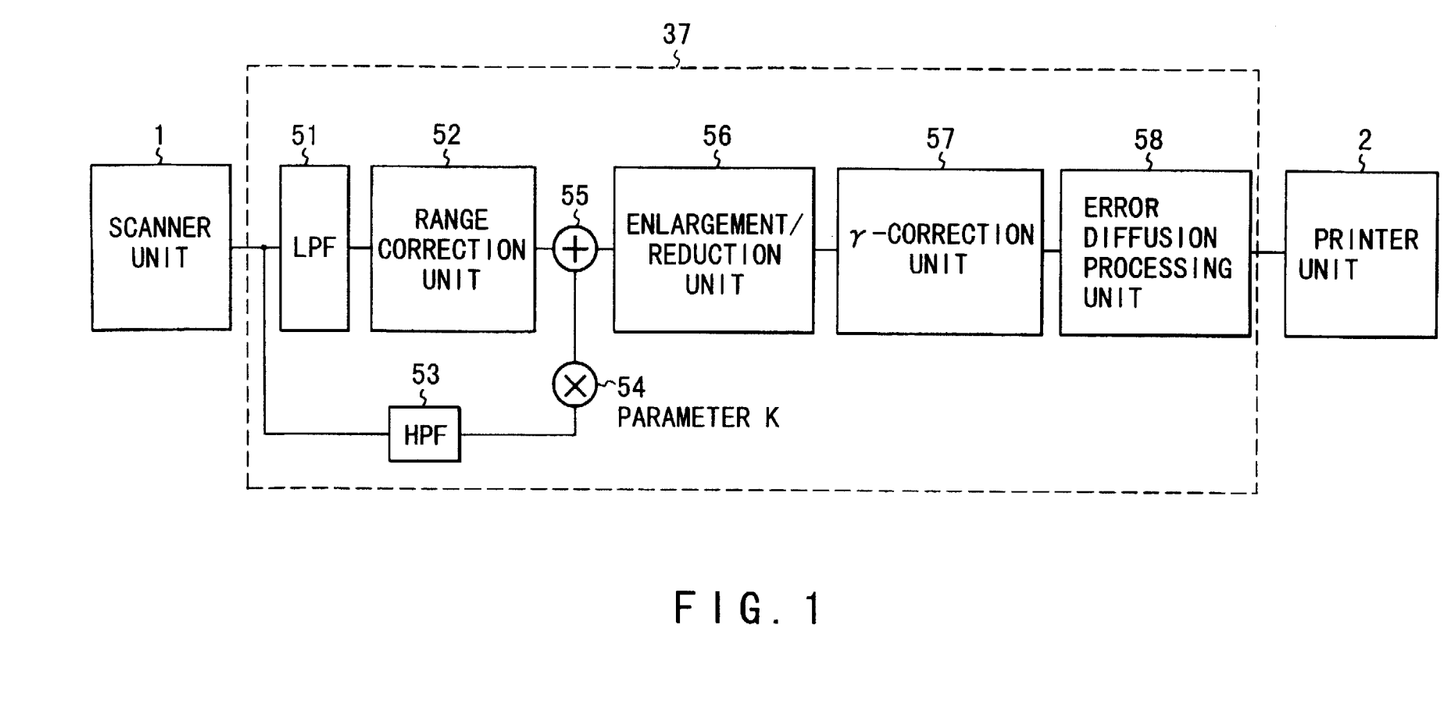
FIG. 1 is a block diagram illustrating the structure of the image processing unit in a digital copying machine according to the present invention.

FIG. 1 shows the internal structure of the image processing unit 37 serving as the image processing apparatus.

The image processing unit 37 includes a low pass filter (to be called LPF hereinafter) 51 for suppressing moire or the like, of image data read by the scanner unit 1e a range correction unit 52 for correcting the irregularity of the CCD sensor 5, a high pass filter (to be called HPF hereinafter) 53, connected in parallel with the LPF 51, for emphasizing an edge or the like, of a character of the image read by the scanner unit 1, a multiplier for multiplying image data from the range correction unit 52, with a parameter K, which will be described later, an adder 55 for adding image data from the multiplier 54 to image data from the range correction unit 52, an enlargement/contraction unit 56 for subjecting the image data from the adder 55 to an enlargement or contraction process, and γ-correction unit 57 for performing various types of γ-corrections on the image data, and an error diffusion processing unit 58 for subjecting image data from the γ-correction unit 57 to an error diffusion process.

Figure 4:
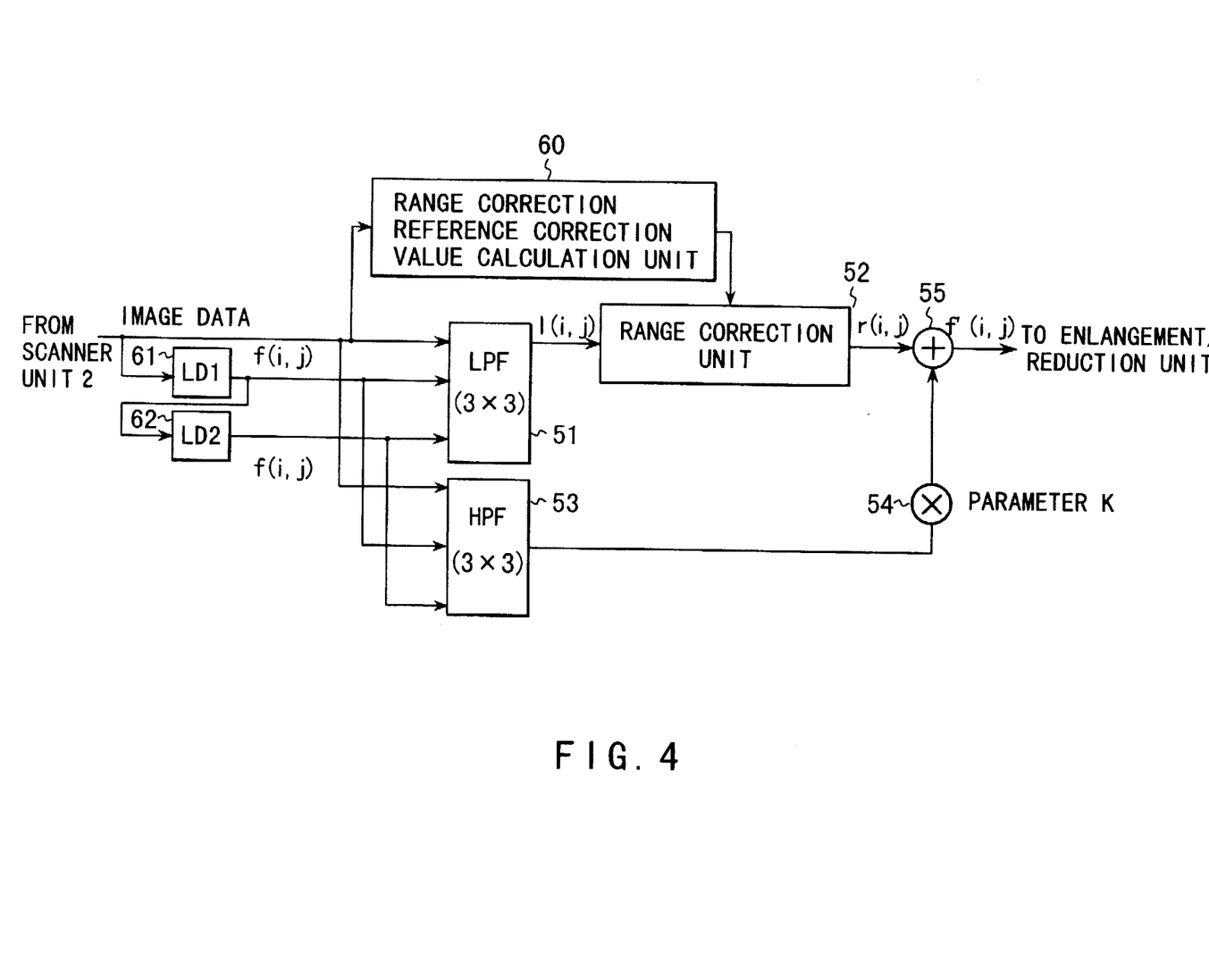
FIG. 4 is a diagram showing an example of the circuit of the image processing unit shown in FIG. 1.

FIG. 4 shows an example of the circuit for performing the process of the LPF 51 and HPF 53 for the mask size (3×3) of the structure of the image processing unit 37 shown in FIG. 1. It should be noted that all of the data handled in this case are of 8-bit.

More specifically, in the image processing unit 37 for a mask size of (3×3), two line buffers, namely, a line buffer (LD1) 61 for taking image data in from the scanner unit 1, and a line buffer (LD2) 62 are provided. Furthers the range correction unit 52 is connected to a range correction reference correction value calculating unit 60 for calculating out a range correction reference value from the image data from the scanner 1.

Next, the operation of the image processing unit 37 of the present invention will now be described with reference to the circuit example of mask size (3×3) shown in FIG. 4.

First, image data input from the scanner 1 is temporarily taken in the line buffers 61 and 62.

Figure 5:
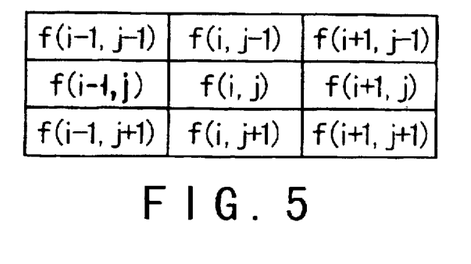
FIG. 5 is a table containing the values of pixels within a local region (3×3), of the image data.
Figure 6:
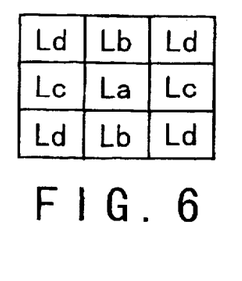
FIG. 6 is a table containing the coefficients for low pass filters.

Supposing, of the image data input in synchronous with predetermined clocks from the line buffers 61 and 62, the values of the pixels of a local region of (3×3) are f(i−1, j−1), f(i, j−1), f(i+1, j−1), f(i−1, j), f(i, j), f(i+1, j), f(i−1, j+1), f(i, j+1) and f(i+1, j+1), the result, that is, l(i, j), of the process of the focused pixel, f(i, j), by the LPF 51 can be expressed by the following equation:

$$l(i, j) = La * f(i, j) + Lb * [f(i, j-1) + f(i, j+1)] +$$
$$Lc * [f(i-1, j) + f(i+1, j)] + Ld * [f(i-1, j-1) +$$
$$f(i+1, j-1) + f(i-1, j+1) + f(i+1, j+1)]$$

where La, Lb, Lc and Ld are coefficients for the LPF 51 of (3×3) shown in FIG. 6, and they must satisfy the following condition in order not to cause a change in the local average concentration between before and after the process:

$$La+2*Lb+2*Lc+4*Ld=1.$$

Next, the result of the process by the LPF 51 is further subjected to the range correction process by the range correction unit 52 for the purpose of correcting the contrast of the image, and let us suppose the value of this process is r(i,j).

Further, in parallel with the process by the LPF 51 and the range correction process of the range correction processing unit 52, the process by the HPF 53 is carried out in a manner similar to that of the LPF 51 as follows. That is, of the image data taken in by the line buffers 61 and 62, the values of the pixels of a local region of (3×3), that is, f(i−1, j−1), f(i, j−1), f(i+1, j−1), f(i−1, j), f(i, j), f(i+1, j), f(i−1, j+1), f(i, j+1) and f(i+1, j+1), are multiplied with coefficients Ha, Hb, Hc and Hd.

To be specific, the result, that is, h(i, j), of the process of the focused pixel, f(i, j), by the LPF 53 can be expressed by the following equation:

$$h(i, j) = Ha * f(i, j) + Hb * [f(i, j-1) + f(i, j+1)] +$$
$$Hc * [f(i-1, j) + f(i+1, j)] + Hd * [f(i-1, j-1) +$$
$$f(i+1, j-1) + f(i-1, j+1) + f(i+1, j+1)].$$

Figure 7:
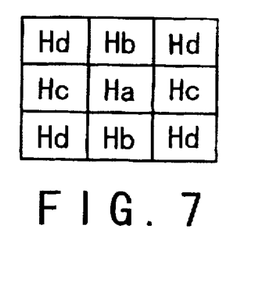
FIG. 7 is a table containing the coefficients for high pass filters.

The coefficients Ha, Hb, Hc and Hd of the HPF 53 are arranged as can be seen in FIG. 7. Further, the intensity of emphasizing the edge can be changed by multiplying the result of the process by the HPF 53 with the parameter K. In other words, as the value of the coefficient is higher, the degree of the emphasizing the edge becomes higher, and therefore the optimal value can be set in accordance with the MTF characteristics and the like, of the scanner unit 2.

The results of the calculations performed in parallel are added up on the basis of the following equationg and the result, f(i, j) is subjected to the processes from the enlargement/contraction process onwards, shown in FIG. 1 Then, the processed result is output by the printer.

$$f(i, j)=r(i, j)+h(i, j) \times K$$

With the method discussed above, the filtering process of pixels having a mask size of (3×3) can be realized by only 2 lines of buffers.

It should be noted that, in the case where the process is carried out through the conventional method, the process of the HPF is carried out on the result of the range correction, and therefore 2 lines of buffers for temporarily storing the result of the range result, and another 2 lines of buffers for reading an image input via the scanner 2 at the beginning, a total of 4 lines are required.

By contrast, in the present invention, the processes by the LPF 51 and the HPF 53 are performed in parallel, and therefore it becomes possible to reduce the number of line buffers by 2.

Further, in the conventional technique, the result of the processing of an input image by the LPF 51, or by the range correction unit 52, is then subjected to the process by the HPF 53 whereas in the present invention, an input image is subjected directly to the process by the HPF 53, and therefore the degree of the emphasis of the edge is made stronger as compared to the conventional technique. As a result, there may rise a problem of easily generating a moire; however such a problem can be solved by setting the parameter K used to change the intensity of the process by the HPF 53, to the optimal value.

Figure 8:
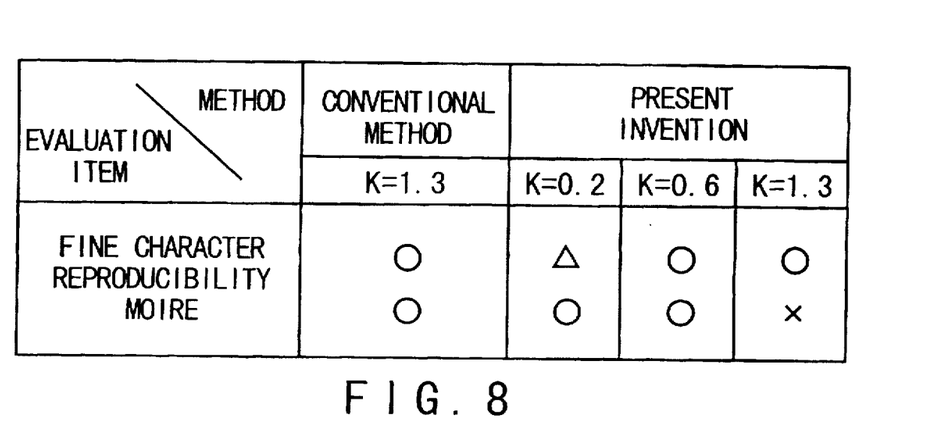
FIG. 8 is a table showing results of the evaluation of images in the case where the value of parameter K is varied.

FIG. 8 shows the results of the evaluation of an image in the case where the value of the parameter K is varied. As shown in this table, with the conventional techniques a good fine character reproducibility and a good moire suppression property were obtained when K=1.3, whereas with the present invention, the edge emphasis is excessively high when K=1.3. A simulation test proved that when the K value is decreased to about 0.6, an image of a quality as high as that of the conventional technique could be obtained.

It should be noted that in the present invention, the variation of the image is slightly large with respect to the variation of the value of the parameter K, and therefore it is necessary to set the accuracy of the parameter K more finely than in the conventional case.

Figure 9A:
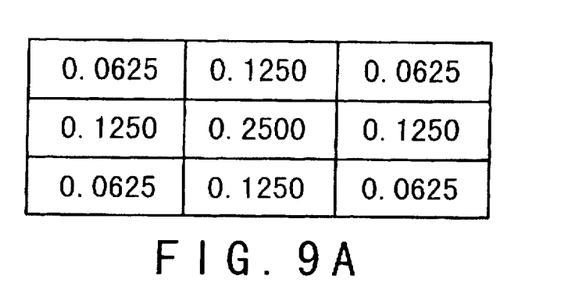
FIGS. 9A, 9B and 9C are tables each containing coefficients for LPF or HPF.
Figure 9B:
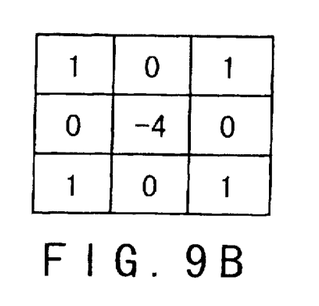

In the embodiment described above the coefficients listed in FIG. 9A were used for the LPF 51, and those of FIG. 9B were used for the HPF 53.

Further, although the value, K=0.6, is preferable as the parameter K, in terms of a fine character reproducibility and the prevention of generating a moire, the preferable value may vary slightly depending upon coefficients selected for the LPF 51 and the HPF 53.

Figure 9C:
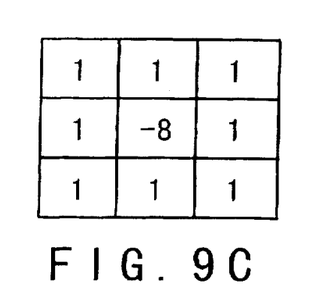

For example, in the case where the coefficients for the HPF 53 are varied as can be seen in FIG. 9C, the edge is emphasized more than that of the above-described embodiment, and therefore the optimal value for the parameter K becomes a lower one. Thus, as the value for the parameter K, an optimal value which corresponds to the coefficients selected for the LPF 51 and the HPF 53 must be selected.

The above-described embodiment was discussed in connection with the case of a mask size of (3×3); however the present invention is not limited to this mask size, but the size can be freely set. Generally, in the case of a mask size of (n×n), the number of line buffers necessary is n−1, which is only a half as many of those required in the conventional case.

Further, the arrangement of the coefficients is not limited to that discussed in the above embodiment, and it is possible that all the coefficient values within a mask size are changed.

As described above, according to the embodiment of the present invention, the LPF process and the HPF process for an image input from the scanner can be carried out in parallel, and therefore the number of line memories can be reduced.

Further, when the value of the parameter K is optimized, an image of a quality as high as that of the conventional case, can be obtained.

To summarize, the present invention provides an image forming apparatus capable of reducing the number of line buffers used for the process with a mask size of (n×n) in the filtering process of the image processing device.

Additional advantages and modifications will readily occur to those skilled in the art. Therefore, the invention in its broader aspects is not limited to the specific details and representative embodiments, shown and described herein. Accordingly, various modifications may be made without departing from the spirit or scope of the general inventive concept as defined by the appended claims and their equivalents

I claim:

1. An image forming apparatus comprising:

means for reading image data from an original sheet;

a low pass filter for treating the image data to remove noise from the image data, wherein the low pass filter has a mask size;

range correction means for performing a range correction process on an output of the low pass filter and outputting a first process result;

a high pass filter having a filter frequency range higher than that of the low pass filter for treating the image data to emphasize an edge portion of the image and outputting a second process result in parallel with the first process result of the low pass filter and range correction means, wherein the high pass filter has a mask size equal to the mask size of the low pass filter;

means for adding up the first process result and the second process result; and means for forming an image corresponding to the result of addition obtained by the adding means.

2. An image forming apparatus according to claim 1, further comprising means for changing an intensity of an edge emphasis by multiplying the second process result with a parameter for adjusting the edge emphasis intensity.

3. An image forming apparatus according to claim 1, further comprising: means for contracting or enlarging the addition result obtained by the adding means, and supplying the contracted or enlarged result to the image forming means.

4. An image forming apparatus according to claim 1, further comprising: means for performing a γ-correction on the addition result obtained by the adding means, and supplying the corrected result to the image forming means.

5. An image forming apparatus according to claim 1, further comprising: means for correcting the addition result obtained by the adding means by means of an error diffusion method, and supplying the corrected result to the image forming means.

6. An image forming apparatus according to claim 1, wherein the low pass filter has a mask size of 3×3, coefficients of coordinates of which are: (0, 0)=(0.0625), (0, 1)=(0.1250), (0, 2)=(0.0625), (1, 0)=(0.1250), (1, 1)= (0.2500), (1, 2)=(0.1250), (2, 0) =(0.0625), (2, 1)=(0.1250) and (2, 2)=(0.0625); and the high pass filter has a mask size of 3×3, coefficients of coordinates of which are: (0, 0)=(1), (0, 1)=(0), (0, 2)=(1), (1, 0)=(0), (1, 1)=(−4), (1, 2)=(0), (2, 0)=(1), (2, 1)=(0) and (2, 2)=(1).

7. An image forming apparatus according to claim 1, wherein the low pass filter has a mask size of 3×3, coefficients of coordinates of which are: (0, 0)=(0.0625), (0, 1)=(0.1250), (0, 2)=(0.0625), (1, 0)=(0.1250), (1, 1)= (0.2500), (1, 2)=(0.1250), (2, 0)=(0.0625), (2, 1)=(0.1250) and (2, 2)=(0.0625); and the high pass filter has a mask size of 3×3, coefficients of coordinates of which are: (0, 0) (1), (0, 1)=(1), (0, 2)=(1), (1, 0)=(1), (1, 1)=(−8), (1, 2)=(1), (2, 0)=(1), (2, 1)=(1) and (2, 2)=(1).

8. An image processing apparatus comprising:

means for reading image data from an original sheet;

a low pass filter for treating the image data to remove noise from the image data, wherein the low pass filter has a mask size;

range correction means for performing a range correction process on an output of the low pass filter and outputting a first process result;

a high pass filter having a filter frequency range higher than that of the low pass filter for treating the image data to emphasize an edge portion of the image and outputting a second process result in parallel with the first process result of the low pass filter and range correction means, wherein the high pass filter has a mask size equal to the mask size of the low pass filter; and means for adding up the first process result and the second process result.

9. An image processing apparatus according to claim 8, first processing means low pass filter has a mask size of 3×3, coefficients of coordinates of which are: (0, 0)=(0.0625), (0, 1)=(0.1250), (0, 2)=(0.0625), (1, 0)=(0.1250), (1, 1)=(0.2500), (1, 2)=(0.1250), (2, 0)=(0.0625), (2, 1)=(0.1250) and (2, 2)=(0.0625); and the high pass filter has a mask size of 3×3, coefficients of coordinates of which are: (0, 0)=(1), (0, 1)=(0), (0, 2)=(1), (1, 0)=(0), (1, 1)=(−4), (1, 2)=(0), (2, 0)=(1), (2, 1)=(0) and (2, 2)=(1).

10. An image processing apparatus according to claim 8, wherein the low pass filter has a mask size of 3×3, coefficients of coordinates of which areg (0, 0)=(0.0625), (0, 1)=(0.1250), (0, 2)=(0.0625), (1, 0)=(0.1250), (1, 1)=(0.2500), (1, 2)=(0.1250), (2, 0)=(0.0625), (2, 1)=(0.1250) and (2, 2)=(0.0625); and the high pass filter has a mask size of 3×3, coefficients of coordinates of which are: (0, 0)=(1), (0, 1)=(1), (0, 2)=(1), (1, 0)=(1), (1, 1)=(−8), (1, 2)=(1), (2, 0)=(1), (2, 1)=(1) and (2, 2)=(1).

11. An image forming method comprising:

reading image data from an original sheet;

low pass filtering the image data to remove noise from the image data wherein the low pass filtering step uses a low pass filter having a mask size;

performing a range correction process on the output of the low pass filtering step and outputting a first process result;

high pass filtering the image data, using a high pass filter having a filter frequency range higher than and a mask size equal to that of the low pass filter, for treating the image data to emphasize an edge portion of the image and outputting a second process result in parallel with the first process result;

adding the first process result and the second process result; and forming an image corresponding to the result of addition of the adding step.

12. An image forming method according to claim 11, further comprising a step of changing an intensity of an edge emphasis by multiplying the second process result with a parameter for adjusting the edge emphasis intensity.

13. An image forming method according to claim 11, further comprising a step for contracting or enlarging the addition result obtained by the adding step, and supplying the contracted or enlarged result to the image forming step.

14. An image forming method according to claim 11, further comprising a step for performing a γ-correction on the addition result obtained by the adding step, and supplying the corrected result to the image forming step.

15. An image forming apparatus according to claim 11, further comprising a step for correcting the addition result obtained by the adding step by means of an error diffusion method, and supplying the corrected result to the image forming step.

16. An image forming method according to claim 11, wherein the low pass filter has a mask size of 3×3, coefficients of coordinates of which are: (0, 0)=(0.0625), (0, 1)=(0-1250), (0, 2)=(0.0625), (1, 0)=(0.1250), (1, 1)=(0.2500), (1, 2)=(0.1250), (2, 0)=(0.0625), (2, 1)=(0.1250) and (2, 2)=(0.0625); and the high pass filter has a mask size of 3×3, coefficients of coordinates of which are: (0, 0)=(1), (0, 1)=(0), (0, 2)=(1), (1, 0)=(0), (1, 1)=(−4), (1, 2)=(0), (2, 0)=(1), (2, 1)=(0) and (2, 2)=1.

17. An image forming method according to claim 11, wherein the low pass filter has a mask size of 3×3, coefficients of coordinates of which are: (0, 0)=(0.0625), (0, 1)=(0.1250), (0, 2)=(0.0625), (1, 0)=(0.1250), (1, 1)=(0.2500), (1, 2)=(0.1250), (2, 0)=(0.0625), (2, 1)=(0.1250) and (2, 2)=(0.0625); and the high pass filter has a mask size of 3×3, coefficients of coordinates of which are: (0, 0)=(1), (0, 1)=(1), (0, 2)=(1), (1, 0)=(0), (1, 1)=(−8), (1, 2)=(1), (2, 0)=(1), (2, 1)=(1) and (2, 2)=(1).

* * * * *